United States Patent [19]
Pearl et al.

[11] Patent Number: 5,922,200
[45] Date of Patent: Jul. 13, 1999

[54] MEMBRANE FILTRATION APPARATUS FOR DEAD END FILTRATION

[75] Inventors: Steven R. Pearl, Nashua; Wayne S. Merrill, Derry; Cristopher J. Petersen, Amherst, all of N.H.

[73] Assignee: Millipore Corporation, Bedford, Mass.

[21] Appl. No.: 08/840,529

[22] Filed: Apr. 22, 1997

Related U.S. Application Data

[62] Division of application No. 08/624,830, Mar. 27, 1996, Pat. No. 5,824,217.

[51] Int. Cl.$^6$ .................................................. B01D 63/08
[52] U.S. Cl. .............................. 210/321.75; 210/321.84; 210/450; 210/455; 210/453; 210/321.6; 210/321.64
[58] Field of Search ......................... 210/321.75, 321.84, 210/450, 453, 455, 321.6, 321.64

[56] References Cited

U.S. PATENT DOCUMENTS 5,225,080  7/1993  Karbachsch et al. ............... 210/321.75
5,429,742  7/1995  Gutman et al. ..................... 210/321.75

FOREIGN PATENT DOCUMENTS 1 494 827  12/1977  United Kingdom .
2 013 522   8/1979  United Kingdom .

*Primary Examiner*—W. L. Walker
*Assistant Examiner*—Terry K. Cecil
*Attorney, Agent, or Firm*—John Dana Hubbard; Timothy J. King; Paul J. Cook

[57] ABSTRACT

A filtration apparatus for deadend filtration is provided which is formed from multilayer presealed elements and monolayer elements that are insert molded together. The device is provided with a feed port, and a filtrate port. The sealing configuration of the presealed elements and the seal provided by the insert molding step effect a seal configuration that causes a feed liquid to be filtered to form a filtrate such that the filtrate is not mixed with the feed.

24 Claims, 16 Drawing Sheets

MEMBRANES, 18,20
 FEED SPACER, 16
 FILTRATE SPACER, 14
 MODULE FIRST SEAL, 13,15
 END CAPS, 17,19
 SECOND SEAL, 21,25

5,922,200

MEMBRANE FILTRATION APPARATUS FOR DEAD END FILTRATION

This patent is a division of patent Ser. No. 08/624,830, filed Mar. 27, 1996, which is now U.S. Pat. No. 5,824,217, issued Oct. 30, 1998.

BACKGROUND OF THE INVENTION

This invention relates to a membrane filtration apparatus for effecting filtration of a liquid composition wherein a feed liquid is introduced into the apparatus and a filtrate stream is removed from the apparatus. More particularly, this invention relates to a tangential flow membrane filtration apparatus or dead ended membrane filtration apparatus which are formed and selectively sealed by injection molding of a polymeric composition.

Prior to the present invention, liquids have been filtered within a plurality of filter modules that are stacked between manifolds or individually sealed to a manifold plate. Each module includes a one or more filter layers separated by appropriate spacer layers, such as screens, to permit liquid feed flow into the apparatus as well as filtrate flow from the apparatus. Filtration within the module can be conducted as a tangential flow process wherein incoming feed liquid is flowed tangentially over a membrane surface to form a retentate and a filtrate. Alternatively, filtration can be conducted as a dead end mode wherein all incoming feed liquid is passed through a membrane filter with retention of solids and other debris on the membrane filter. In this latter mode only a filtrate is recovered.

At the present time, filtrate is sealed from feed within a membrane filtration apparatus by sealing techniques utilizing potting adhesives, solvent bonding or heat sealing. In the case of a tangential flow filtration apparatus, filtrate is sealed from feed and retentate. Adhesives are undesirable since they have limited chemical compatibility, are a source of significant extractable species, introduce process control difficulties, impose bond strength limitations, impose use temperature limitations and increase process cycle time. Heat sealing is undesirable since its use imposes a limitation upon the thickness of the material being heat sealed. In addition, heat sealing is undesirable because it requires multiple steps, imposes material compatibility limitations and requires a substrate to effect heat sealing of filtration elements. Solvent bonding is undesirable since solvents impose environmental limitations and impose limitations on liquids to be filtered.

Accordingly, it would be desirable to provide a multilayer filtration apparatus which utilizes a plurality of filtration modules wherein the layers are appropriately sealed without the use of adhesive, solvent bonding or heat sealing. In addition, it would be desirable to provide a tangential flow or a dead ended filtration apparatus containing a plurality of filtration modules which can be formed into a stack and which can be appropriately sealed to define liquid flow paths within the stack in a one step sealing process.

SUMMARY OF THE INVENTION

In accordance with this invention, a dead ended or tangential flow filtration apparatus is provided which includes a plurality of spaced-apart membranes and a plurality of spacer layers having channels or openings that promote liquid flow therethrough. The dead ended filtration apparatus are provided with at least one feed port and at least one filtrate port. The tangential flow filtration apparatus are provided with at least one feed port, at least one filtrate port and at lease one retentate port. The membranes are included within modules each of which has at least one membrane layer and at least one spacer layer. The modules are presealed by any convenient means so that they can be subsequently sealed with additional modules and spacer layers by an insert molding process to form a membrane filtration apparatus formed from a stack of membranes and spacer layers which permits filtration of a liquid. An optional end cap can be provided at each end of the stack to assure liquid flow from the feed inlet to the retentate outlet, through a membrane, and to the at least one filtrate outlet. The spacer layers are appropriately sealed and side surfaces and end surfaces of the membrane filtration apparatus are appropriately sealed by insert molding with a molten polymeric composition which is caused to migrate into selected volumes of the spacer layers to effect sealing and to assure liquid flow within the stack, during use, from the feed inlet to the at least one filtrate outlet. In the case of a tangential flow filtration apparatus, liquid flow within the stack is assured by sealing the feed inlet and the retentate outlet from the filtrate outlet. Insert molding is accomplished by positioning the stack within an injection mold and injecting the molten polymeric composition into the mold to effect sealing in a manner that assures the desired liquid flow within the final membrane filtration apparatus during use. The spacer layers which accept filtrate are sealed by the plastic composition from a feed port extending into the stack so that the feed must pass through a membrane layer prior to entering a filtrate spacer layer. In addition, the spacer layers adjacent to the feed port which are designated to accept feed remain in liquid communication with the feed channel. Channels which accept either retentate or filtrate also extend into the stack. The channels which accept retentate are sealed from the filtrate spacer layers and are in fluid communication with the spacer layers which are also in fluid communication with the feed port. The port or ports which accept filtrate are sealed from the spacer layers which accept feed or retentate and are in fluid communication with the spacer layers that accept filtrate. The stack is also sealed in a manner so that liquid feed entering the feed spacer layers must pass through a membrane before entering a filtrate spacer layer. Prior to insert molding the stack, the stack is formed from single spacer layer units and multilayer modules which modules are partially presealed so that, in combination with the final insert molding step, the presealing assures the desired liquid flow through the final membrane filtration apparatus.

DESCRIPTION OF THE SPECIFIC EMBODIMENTS

Figure 1:
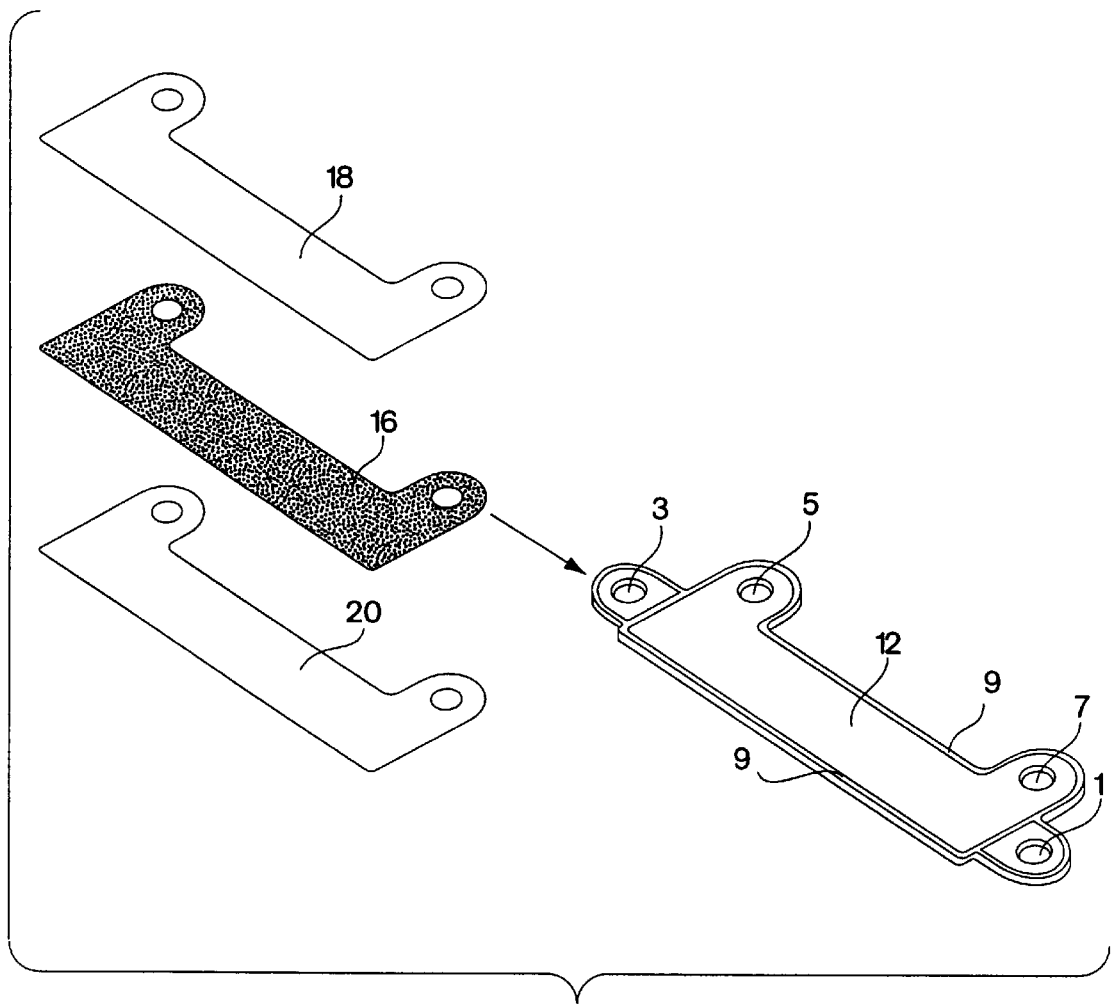
FIGS. 1 and 1A illustrate the process for making one embodiment of a tangential flow filtration apparatus of this invention.

The membrane filtration apparatus of this invention is formed from a stack of multilayer and monolayer elements including working layers comprising membranes and spacer layers that provide a flow path for a liquid stream which is directed through the membranes as well as recovered retentate liquid streams which cannot pass through the membrane. The multilayer elements referred to herein as modules are formed from two or three components, at least one of which is a membrane layer and at least one of which is a spacer layer. The three component module is formed from two membrane layers, each positioned on one surface of a spacer layer. The monolayer comprises a spacer layer and can comprise a defined open volume or a porous single layer such as a screen. When utilizing an open volume as the spacer layer, it is formed with one or two mating rims forming the perimeter of the open volume which separates modules or separates a module and an end of the filtration apparatus. The modules can be formed from more than three layers, if desired. The spacer layer comprises an element having holes, channels or an open volume through which liquid can pass. The spacer layer is contiguous to or contacts a membrane through which liquid passes.

Modules forming a portion of the stack are presealed prior to being positioned within the stack and thereafter insert molded. The presealed configuration of the module will depend upon the position of the element within the stack and upon whether the filtration apparatus is to function in a tangential flow mode or in a dead end flow mode. The module can include either a feed spacer layer or a filtrate spacer layer. When the module includes the feed spacer layer, the module is presealed so that the feed spacer layer is open to the feed port and the retentate port in the filtration apparatus and is closed to the filtrate port or ports. When the module includes the filtrate spacer layer, the module is presealed so that the filtrate spacer layer is closed to the feed port and the retentate port, and is open to the filtrate port or ports. The monolayer elements within the stack forming the filtration apparatus comprise spacer layers. The membranes utilized in the stack can comprise ultrafiltration membranes, microporous membranes, nanofiltration membranes or reverse osmosis membranes. In a tangential flow filtration apparatus of this invention, the feed, retentate and filtrate ports are arranged so that incoming liquid feed to the filtration apparatus enters at least one feed channel, passes through the feed spacer layers and either passes through a membrane to form a filtrate stream or is retained by a membrane to form a retentate stream. The retentate stream is removed from the filtration apparatus through one or more retentate ports and the filtrate stream is removed from the filtration apparatus from one or more filtrate ports. If desired, multiple filtrate ports can be arranged to effect tangential fow on the filtrate side of the membranes. There is an inlet filtrate port(s) and an outlet filtrate port(s). In tis case a portion of the filtrate can be recycled to the inlet filtrate port or ports as a means for controlling pressure on surfaces of the membranes within the stack. In a dead end flow filtration apparatus of this invention, the feed and filtrate ports are sealed from each other and only filtrate is recovered from the module. In the final step for forming the filtration apparatus of this invention, the stack of at least one module and at least one spacer layer is positioned within a mold and a flowable, e.g. liquid, polymeric composition is injected into the mold to seal the stacked elements together and to selectively migrate into either the feed spacer layers or the filtrate spacer layers to selectively seal the spacer layers thereby to assure liquid flow through the filtration apparatus described above.

Representative suitable membrane filters are ultrafiltration, microporous, nanofiltration or reverse osmosis filters formed from polyvinylidene fluoride (PVDF), polysulfone, polyethersulfone, regenerated cellulose, polyamide, polypropylene, polyethylene, polytetrafluoroethylene, cellulose acetate, polyacrylonitrile, vinyl copolymer, cellulose acetate, polyacrylonitrile, vinyl copolymer, polycarbonate, PFA, blends thereof or the like. Suitable polymeric sealing compositions are those which provide the desired sealing configuration within the filtration apparatus and do not significantly degrade the elements forming the apparatus including the membranes, spacer layer ports and housing elements. In addition, the sealing composition should not degrade or provide a significant source of extractables during use of the apparatus. Representative suitable sealing compositions are thermoplastic polymer compositions including those based on polypropylene, polyethylene, PFA, PVDF, polysulfones, polyethersulfone, polycarbonate, acrylonitrile-butadiene-styrene (ABS), polyester, blends thereof, filled or unfilled or the like.

Figure 1A:
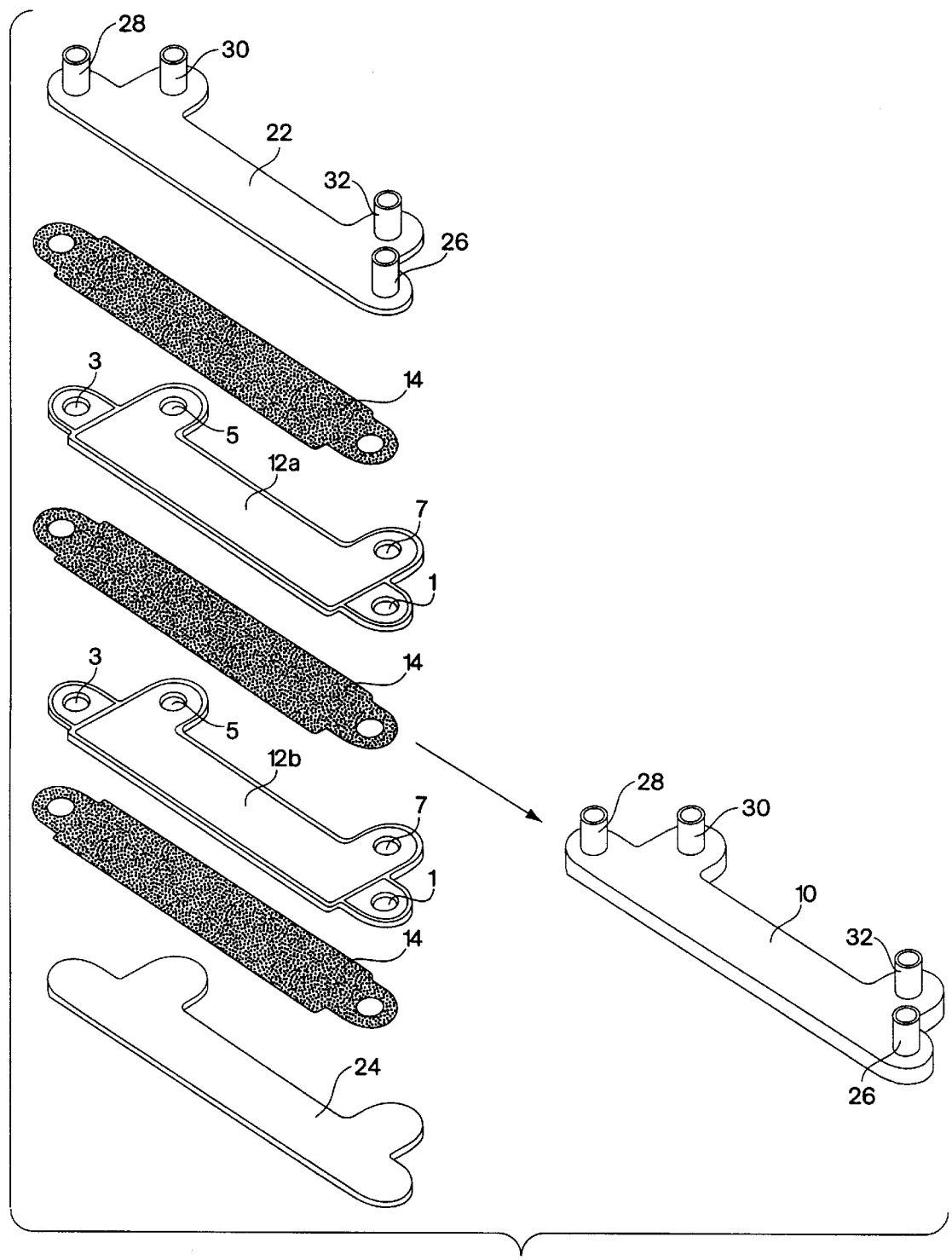

Referring to FIGS. 1 and 1A, a filtration apparatus of this invention, 10 is formed from a plurality of modules 12 and a plurality of spacer layers 14. The modules 12 are formed from a feed spacer layer 16 which can comprise a screen or the like and two membrane layers 18 and 20 and include filtrate ports 1 and 3, feed port 5 and retentate port 7. The module 12 is formed by placing the membrane layers 18 and 20 and spacer layer 16 in a mold and molding a plastic composition around the layers and selectively into the layers to form a first seal about the layers and to form a peripheral raised rib 9. The module 12 is presealed in a manner which will be more fully described with reference to FIG. 4. The modules 12a and 12b as well as the filtrate screens 14 are positioned between end caps 22 and 24 within a mold and all of these elements are joined together to form a second seal by being insert molded within the mold. The end cap 22 is provided with filtrate ports 26 and 28, feed port 30 and retentate port 32. The module 10 is shown in FIGS. 1 and 1A is a tangential flow filtration module since it includes a retentate port 32 from which retentate is collected. A dead end filtration module is formed in the same manner but eliminating retentate ports 17 and 32.

Figure 2:
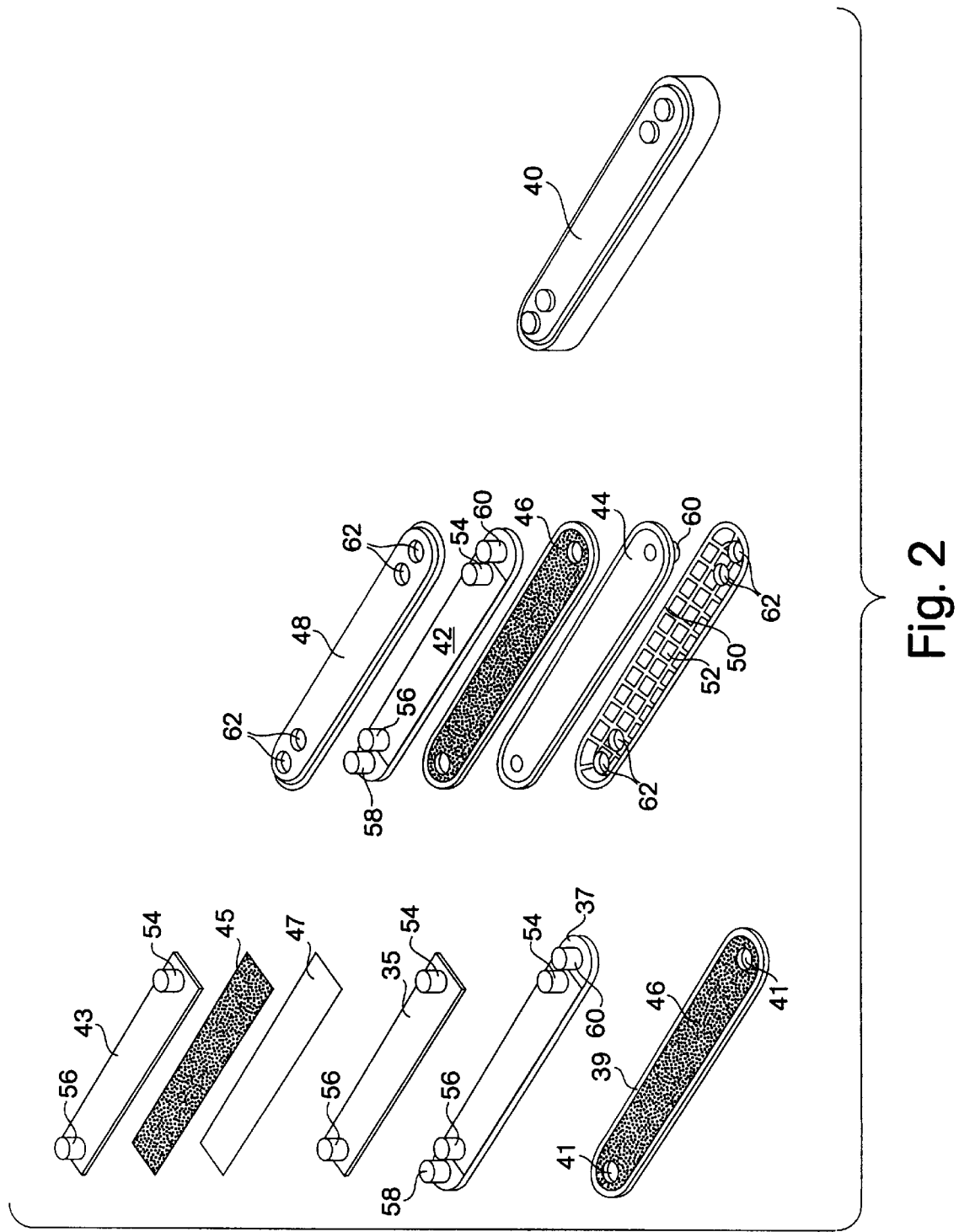
FIG. 2 illustrates the process for making a second embodiment of tangential flow filtration apparatus of this invention.

Referring to FIG. 2, the membrane filtration apparatus 40 is formed from two modules 42 and 44, and a feed spacer layer 46. In addition, the membrane filtration apparatus 40 can optionally include anti-deflection end caps 48 and 50 having ribbed interior surfaces 52. The filtration module 40 is formed by insert molding Modules 42 and 44 include two filtrate outlet ports 54 and 56, a feed inlet port 58 and a retentate outlet port 60. The anti-deflection caps 48 and 50 include holes 62 through which extend the filtrate ports 54 and 56, the retentate outlet port 60 and the feed inlet 58 for the modules 42 and 44 respectively. The modules 42 and 44 each are formed from an end cap 43, filtrate screen 45 and a membrane 47. In a first step, the end caps 43, filtrate screen 45 and membrane 47 are placed into a mold and are presealed to form a first overmolded element 35. The overmolded element 35 then is placed in a second mold and a plastic composition is molded about overmold 35 to form second overmolded element 37, including retentate outlet port 60 and fed inlet port 58. The feed spacer 46 is formed by molding a rib 39 about a screen having holes 41.

Figure 3:
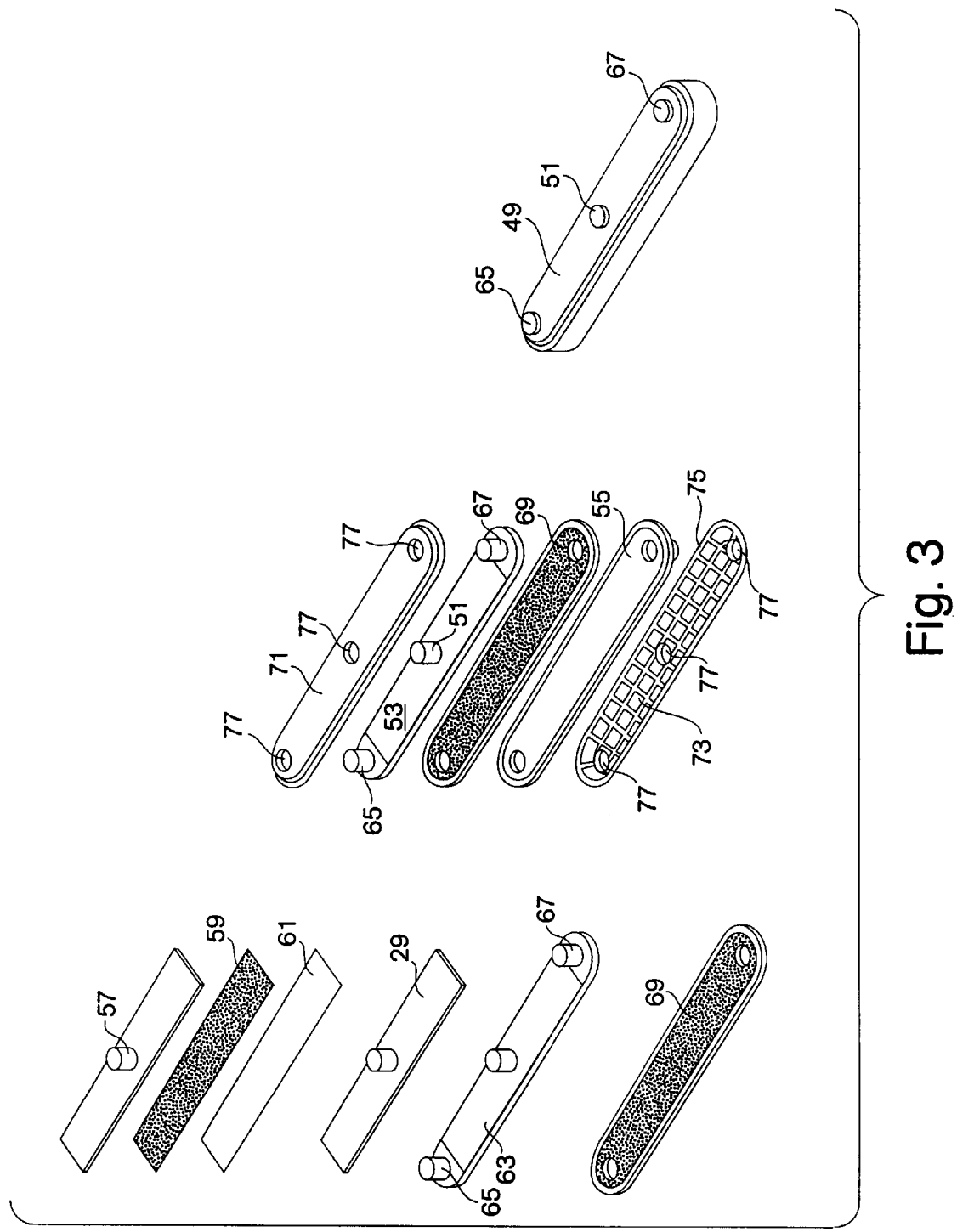
FIG. 3 illustrates the process for making a third embodiment of a tangential flow filtration apparatus of this invention.

Referring to FIG. 3, an alternative membrane filtration apparatus of this invention 49 utilizing a single filtrate exit port 51 on each module is illustrated. The membrane filtration apparatus 49 is formed from two modules 53 and 55. The modules 53 and 55 are formed from a premolded cap 57, a filtrate screen 59 and a membrane 61 which are molded together to form a first overmolded element 29. A second overmolded element 63 is molded using the first overmolded element 29 to form a feed port 65 and a retentate port 67 and to preseal the modules 53 and 55. A feed spacer layer 69 is positioned between the modules 53 and 55. Anti-deflection caps 71 and 73 having ribbed interior surfaces 75 optionally can be utilized. The anti-deflection caps 71 and 73 each are provided with holes 77 which accommodate the ports 65, 51 and 67. The filtration apparatus 49 is formed by insert molding.

Figure 4:
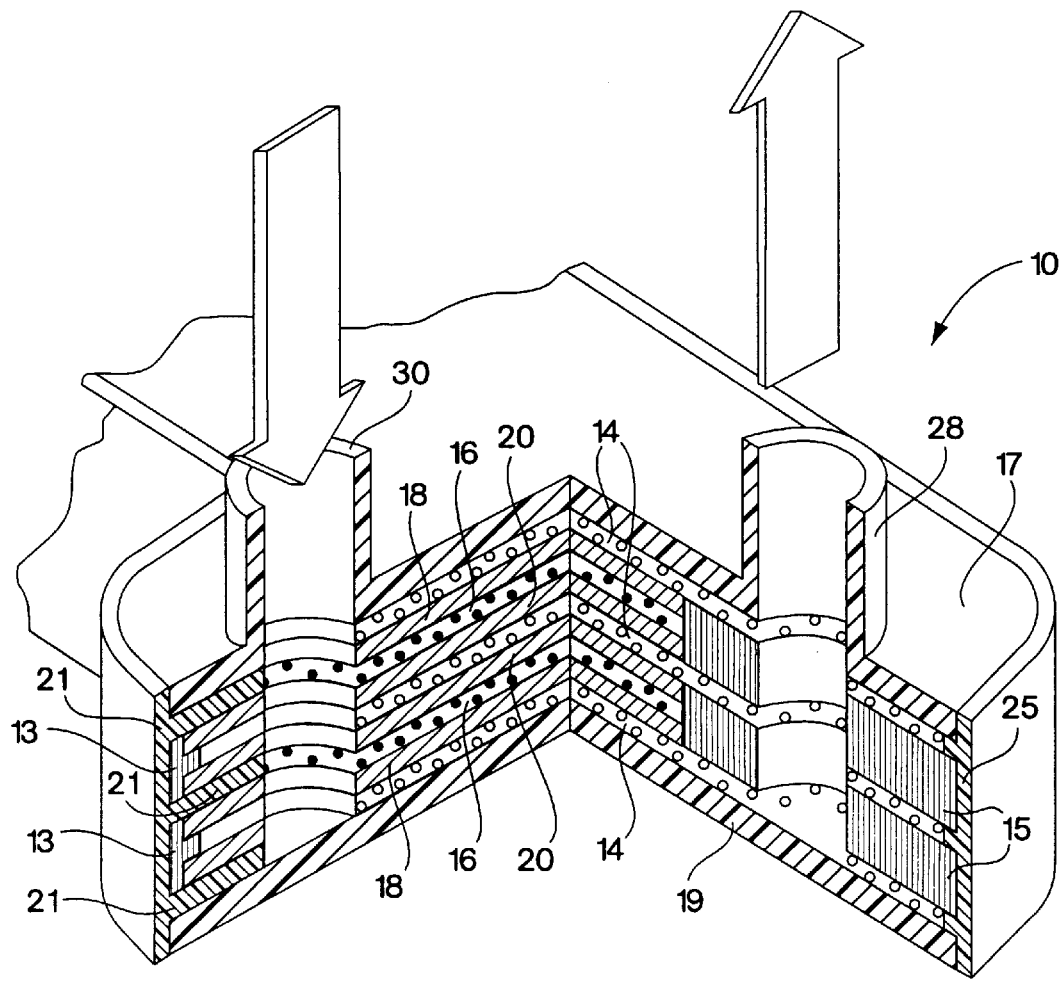
FIG. 4 is a partial cross sectional view of one embodiment of a tangential flow filtration apparatus of this invention.

Referring to FIG. 4, the sealing arrangement for a multilayer embodiment of the membrane filtration apparatus 10 of FIGS. 1 and 1A is illustrated. Prior to being stacked, the module formed of multilayer elements comprising the two membranes 18 and 20 and the feed spacer 16 is presealed in the area adjacent to feed port 30 by seal 13 which seals the membranes 18 and 20 and the spacer 16 together while leaving spacer 16 in open fluid communication with the feed port 30. The modules are presealed differently at the area adjacent the filtrate ports 26 (FIG. 1A) and 28 as compared to the areas adjacent the feed port 30 and the retentate port 32 (FIG. 1A). As shown in FIG. 4, the module is sealed in areas 15 to permit liquid communication between the filtrate layers 14 with the filtrate channels 26 or 28. The area adjacent the retentate port 32 (FIG. 1A) is sealed in the same manner as the area adjacent the feed port shown in FIG. 4. By presealing the modules in this manner, they can be stacked and insert molded to form the filtration apparatus of this invention. The stack of elements, in the final insert molding step are positioned between two end caps 17 and 19 which seal the top and bottom of the stack. Thereafter, a molten polymeric composition is injected into the mold containing the stack to seal the sides of the stack in area 21 adjacent the feed port 30 and to prevent leakage from module 10. The molten polymeric composition also seals the feed spacer layers 16 from fluid communication with the filtrate ports 26 and 28 in areas 25 and to prevent leakage from module 10. The insert molding step is conducted so as to avoid closing the filtrate spacer layers 14 from fluid communication with the filtrate ports 26 and 28. Thus, the molding polymeric composition 25 does not extend a significant distance into the filtrate spacers 14 to maintain this desired open fluid communication with the filtrate ports 26 and 28. By operating in this manner, a stack of filtration elements can be assembled and selectively sealed in a one step insert molding process.

Figure 5:
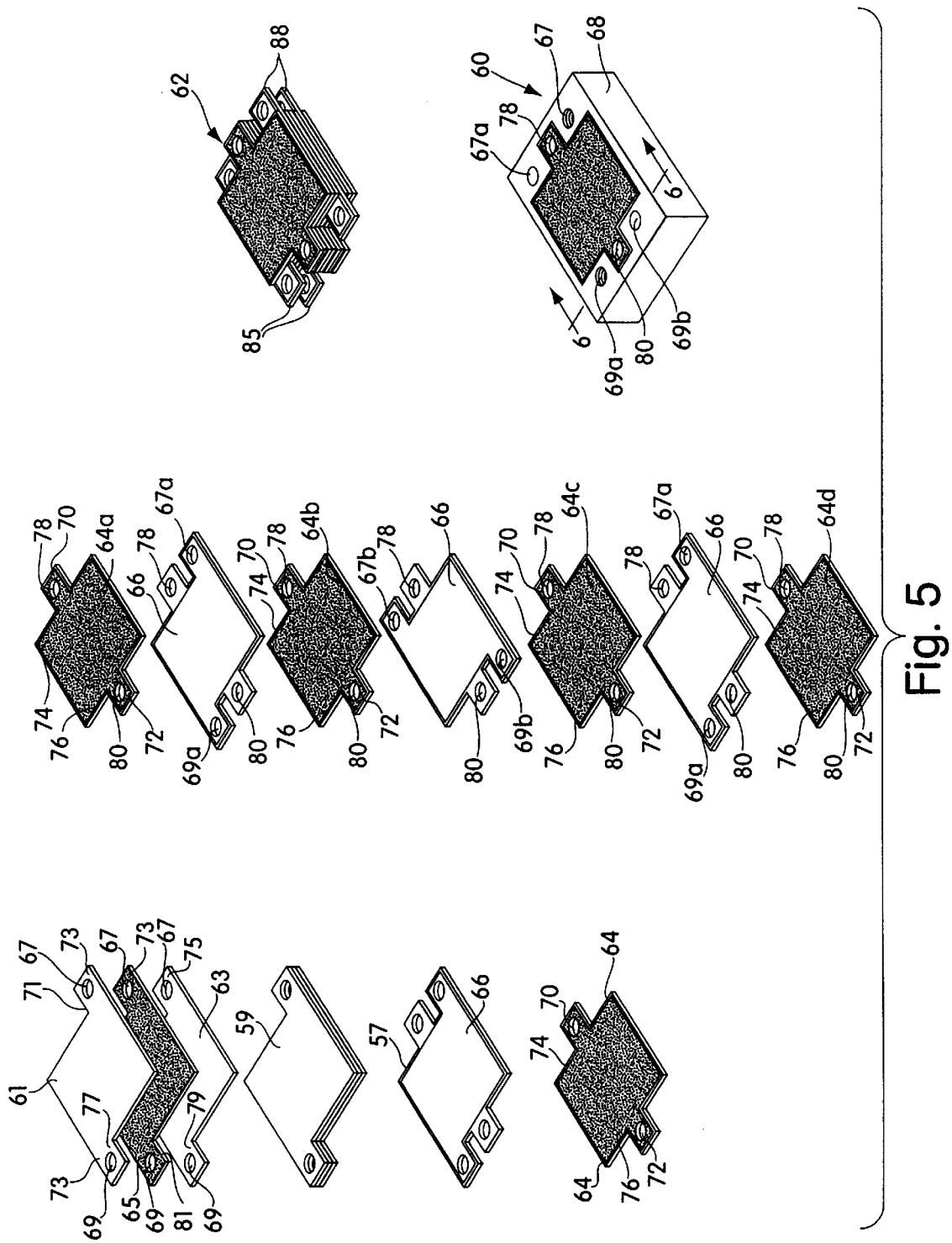
FIG. 5 illustrates a process for making an alternative embodiment of a tangential flow filtration apparatus of this invention.

Referring to FIG. 5, the membrane filtration apparatus 60 is formed from a stack 62 of monolayer feed spacer layers 64, labeled specifically as 64a, 64b, 64c and 64d, and modules 66 which stack has been insert molded to form the overmold 68. The overmold 68 seals the side, top and bottom surfaces of filtration apparatus 60. The overmold 68, formed by insert molding, also seals the internal surfaces of the stack 62 to effect the desired liquid flow within the stack described above is described below with reference to FIG. 6.

The module 66 is formed from an unbonded laminate 59 which is formed from two filter (membrane) layers 61 and 63, filtrate spacer, e.g. screen 65. The molded rim 57 extends about the periphery of the module 66 and serves to accommodate feed spacer layers 64 with a molded rim 64e on both of its surfaces. Each filter layer 61 and 63 and filtrate spacer layer 65 is provided with two filtrate ports 67 and 69 which are positioned diagonally to each other and are positioned within tab sections 71, 73, 75, 77, 79 and 81. The tab sections are positioned on each of these layers. The tab sections 71, 73, 75, 77, 79 and 81 extend away from central portions of each of these layers so that the ports located therein can be easily accessed. The feed spacer layers 64a, 64b, 64c and 64d are also provided with tab sections 70 and 72 positioned on opposing surfaces 74 and 76 of each spacer layer. An opening 78 on one of the tab sections 70 forms part of a feed port within the apparatus 60 while the opening 80 on the other tab 72 forms part of a retentate port within the apparatus 60. The spacer layers 64a, 64c, 64b and 64d can function as either feed spacer layers or as filtrate spacer layers by reversing the feed and filtrate ports. If spacer payers 64 are filtrate spacer layers, then spacer layer 65 becomes a feed spacer. A significant advantage derived from this embodiment is due to the spaced apart filtrate tab sections 83 and 85 formed respectively from tab sections 73, 75 and 71 or 79, 77 and 81. By alternating their positions, more precise control of molten sealing polymeric composition flow can be attained. That is, the filtration element 60 can be more easily selectively sealed since flow of molten polymer composition in the area of each tab section and, therefore each filtrate port can be more easily controlled while minimizing an undesirable sealing configuration within the feed port or retentate port formed by opening 78 or the retentate port formed by openings 80.

Figure 6:
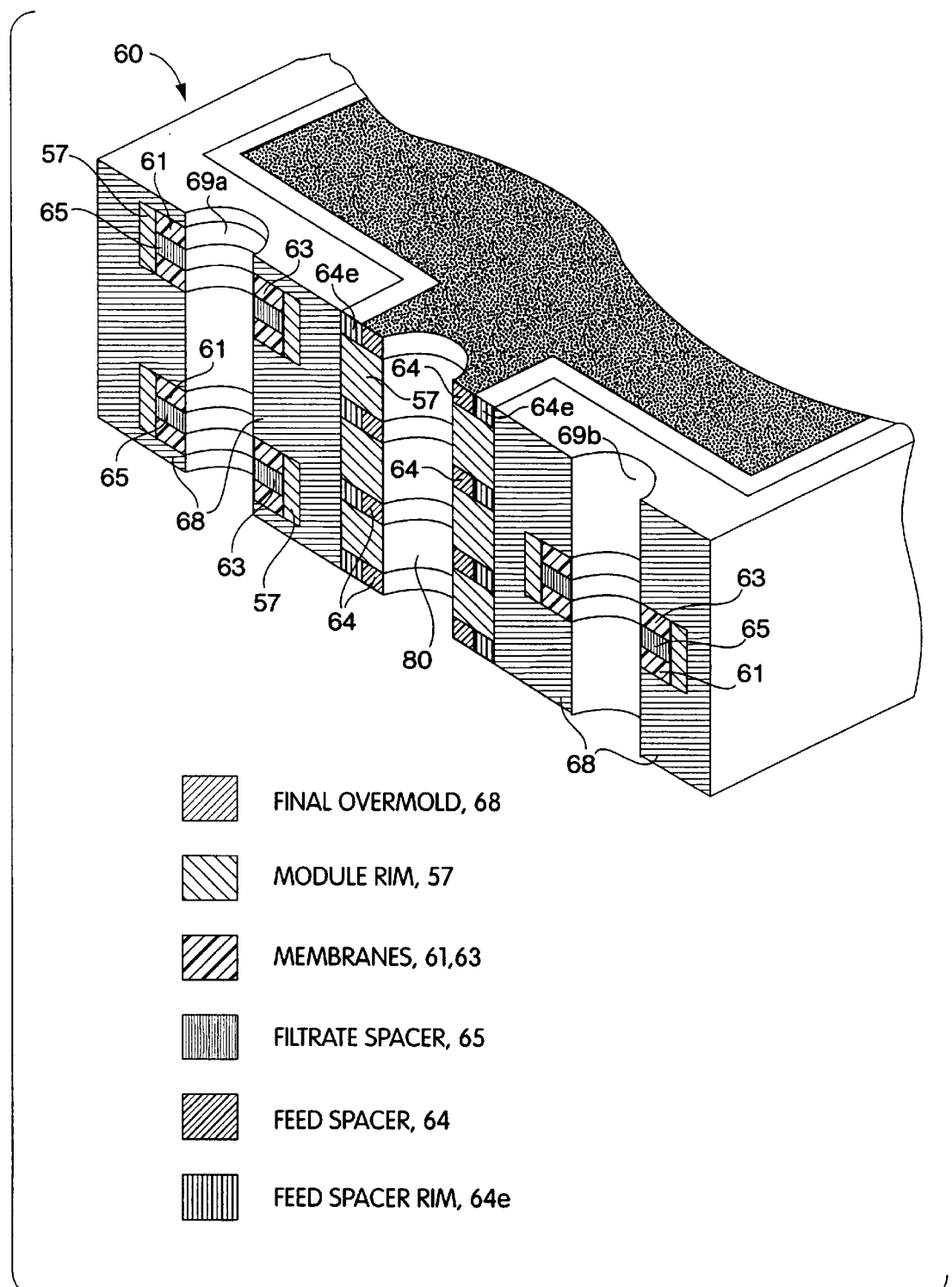
FIG. 6 is a partial cross-sectional view taken along line 6—6 of FIG. 5 of an embodiment of this invention which can be produced by the process illustrated in FIG. 5.

Referring to FIG. 6, the sealing arrangement for the membrane filtration apparatus 60 of FIG. 5 is shown. The module 66 (FIG. 5) formed of membranes 61 and 63 and filtrate spacer 65 are presealed so that filtrate ports 69a and 67a are in fluid communication with the filtrate spacers 65 but not in fluid communication with retentate port 80 or feed port 78 (FIG. 5). The final overmold 68 preserves this sealing arrangement and prevents leakage from module 60.

Figure 7:
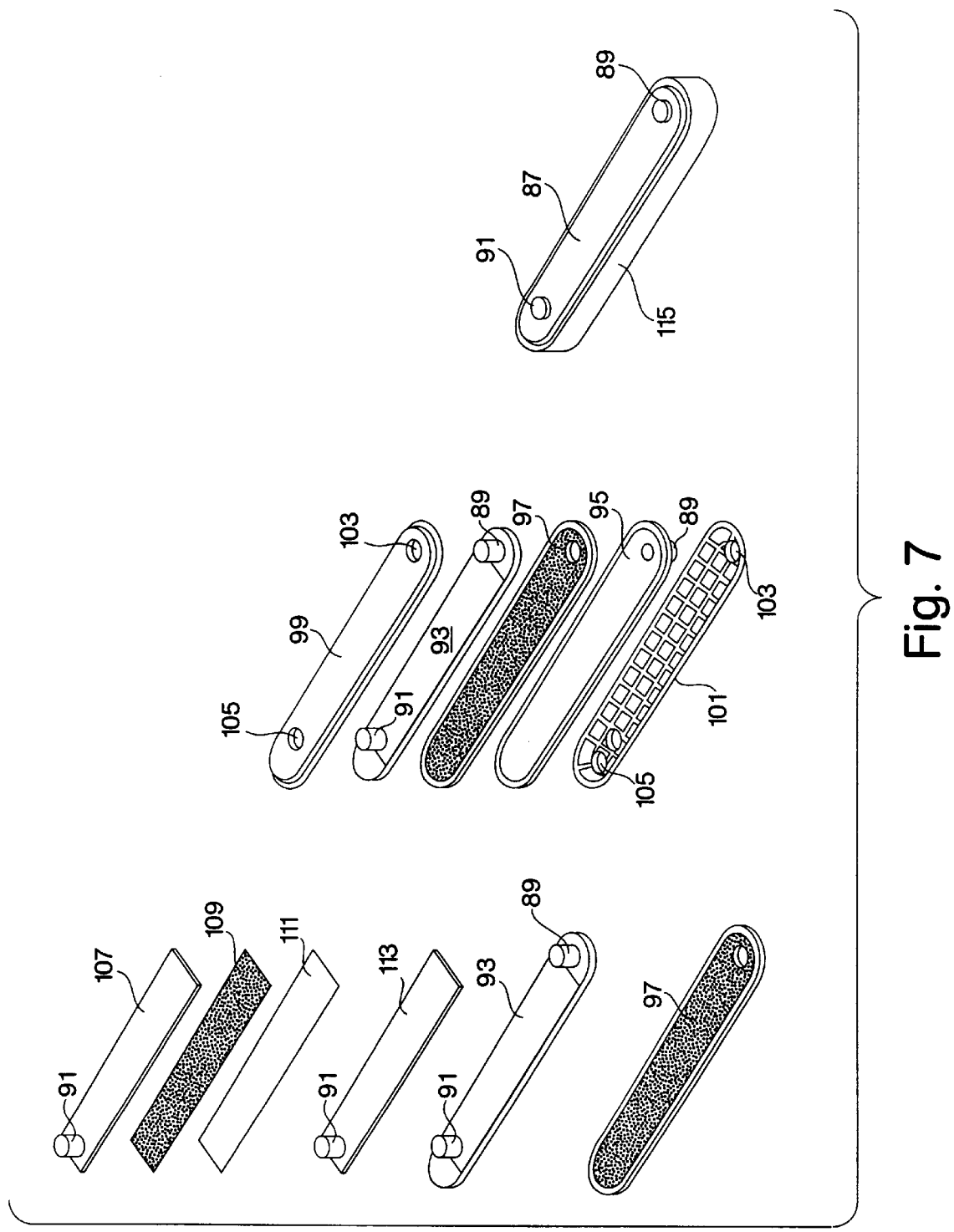
FIG. 7 illustrates a process for making a dead end flow filtration apparatus of this invention.

Referring to FIG. 7, a dead end flow filtration apparatus 87 includes a feed port 89 and a filtrate port 91. The filtration apparatus 87 is formed form two multilayer modules 93 and 95, each of which is formed with the feed port 89 and the filtrate port 91; a spacer layer 97; and two antideflection caps 99 and 101 each are provided with a feed port clearance hole 103 and a filtrate port clearance hole 105. The multilayer modules 93 and 95 can be formed in two steps. In a first step, a premolded end cap 107, a filtrate screen 109 and a membrane 111 are sealed together to form a first overmolded element 113. In a second step, the first overmolded element 113 is overmolded to form multilayer modules 93 and 95 with feed ports 89. The filtration apparatus 87 is formed by sealing together end caps 99 and 101, spacer layer 97 and modules 93 and 95 by an insert molding step which forms outside seal 115 and seals filtrate port 91 from feed port 89 and to allow feed to pass through the membrane 109 to form filtrate.

In FIGS. 8–23, the term, "permeate" is used interchangeably with the term, "filtrate". Also, the term, "screen" is used interchangeably with the term. "spacer layer". n is an integer equal to or greater than one.

Figure 8:
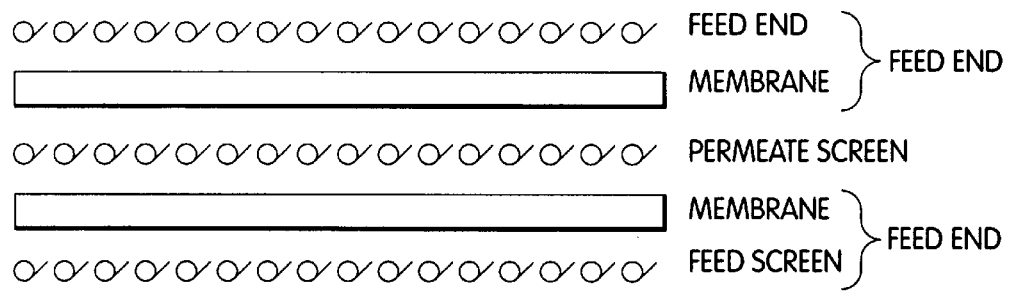
FIGS. 8–23 show labeled single layer and module configurations useful in the present invention.

Referring to FIG. 8, an embodiment is shown having n permeate screens and n plus 1 modules consisting of a feed screen and a membrane. Filtration can also be effected with only 1 permeate screen and 1 module consisting of a feed screen and a membrane.

Figure 9:
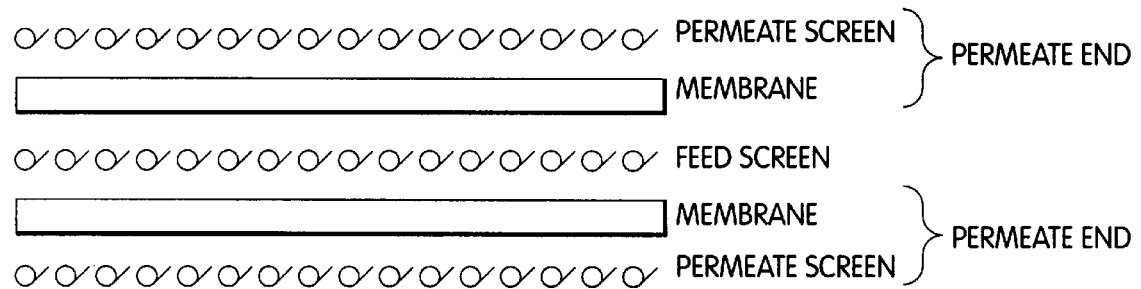

Referring to FIG. 9, an embodiment is shown having n feed screens and n plus 1 modules consisting of a permeate screen and a membrane. Filtration can also be effected with only 1 feed screen and 1 module consisting of permeate screen and membrane.

Figure 10:
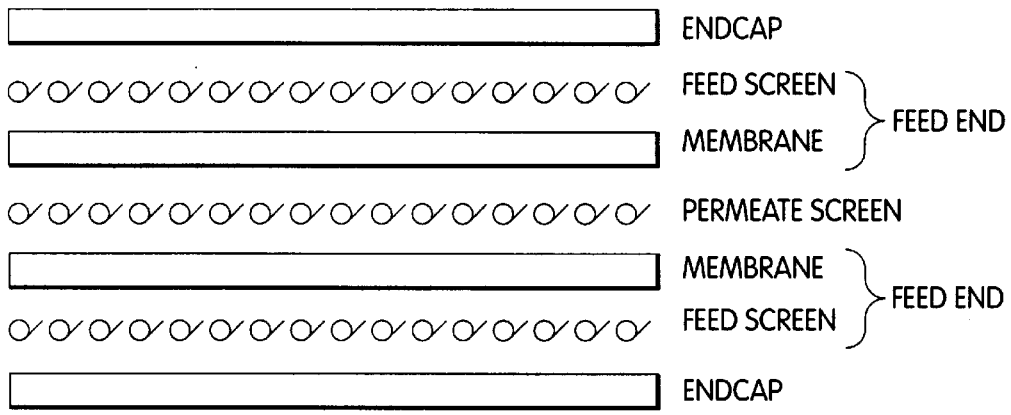

Referring to FIG. 10, an embodiment is shown having 2 end caps, n permeate screens and n plus 1 modules consisting of a feed screen and a membrane.

Figure 11:
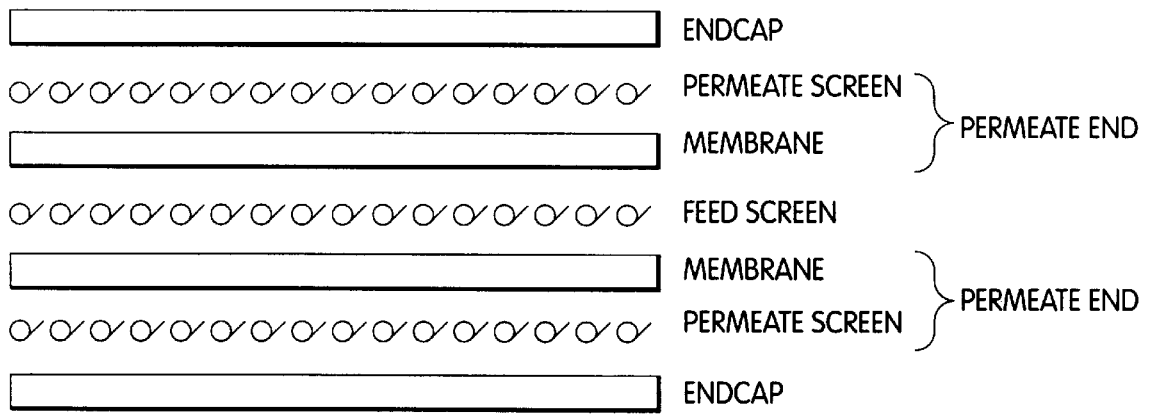

Referring to FIG. 11, an embodiment is shown having 2 end caps, n feed screens and n plus 1 modules consisting of a permeate screen and a membrane.

Figure 12:
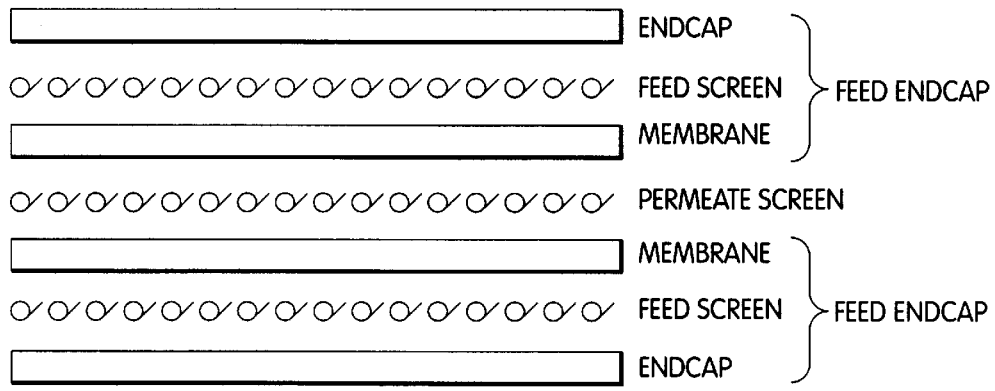

Referring to FIG. 12, an embodiment is shown having 1 permeate screen and 2 modules consisting of a feed screen, a membrane and an end cap.

Figure 13:
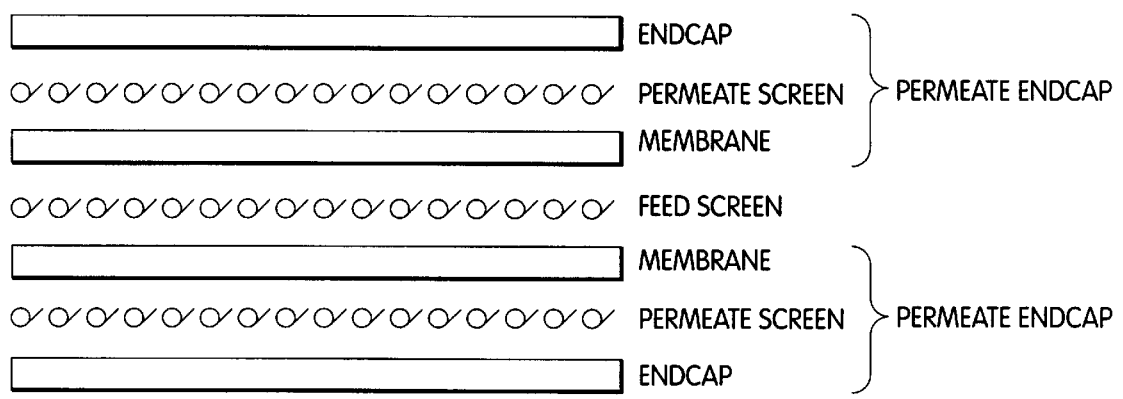

Referring to FIG. 13, an embodiment is shown having 1 feed screen and 2 modules consisting of a permeate screen, a membrane and an end cap.

Figure 14:
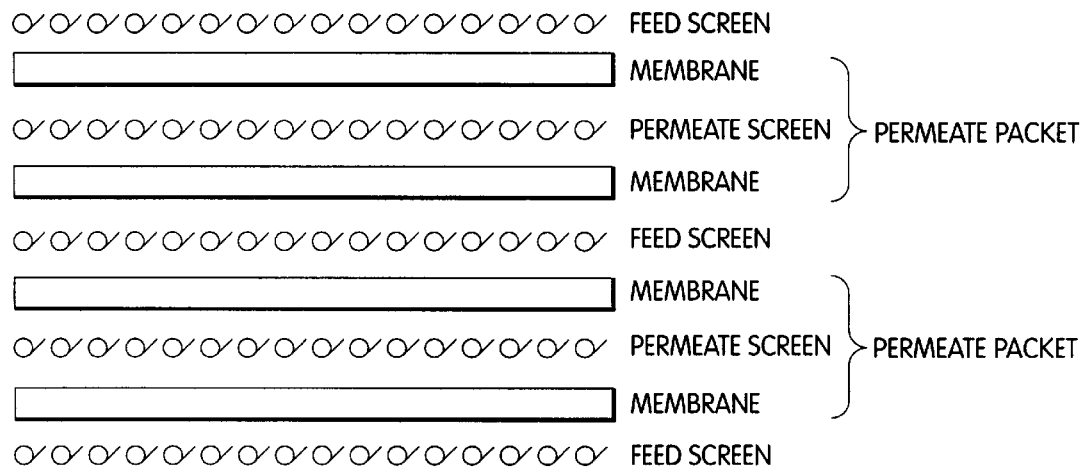

Referring to FIG. 14, an embodiment is shown having n modules consisting of a permeate screen and two membranes and n plus 1 feed screens.

Figure 15:
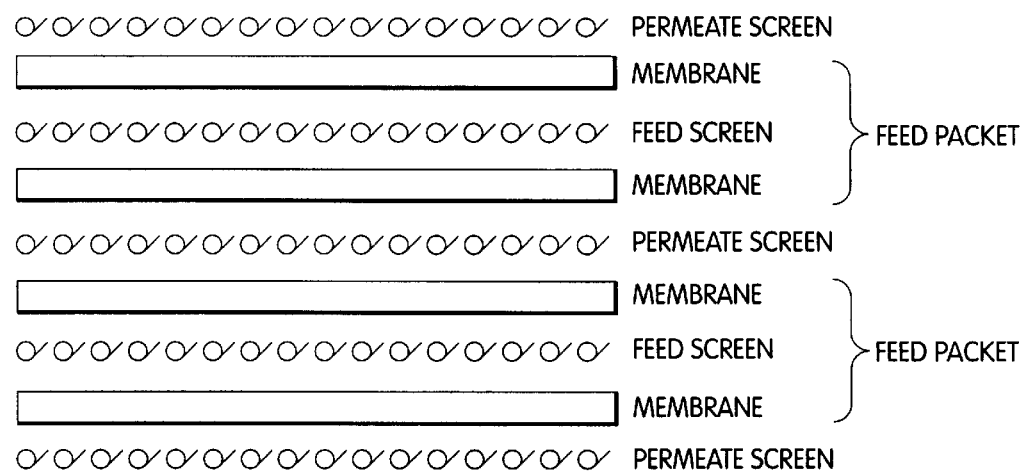

Referring to FIG. 15, an embodiment is shown having n modules consisting of a feed screen and two membranes and n plus 1 permeate screens.

Figure 16:
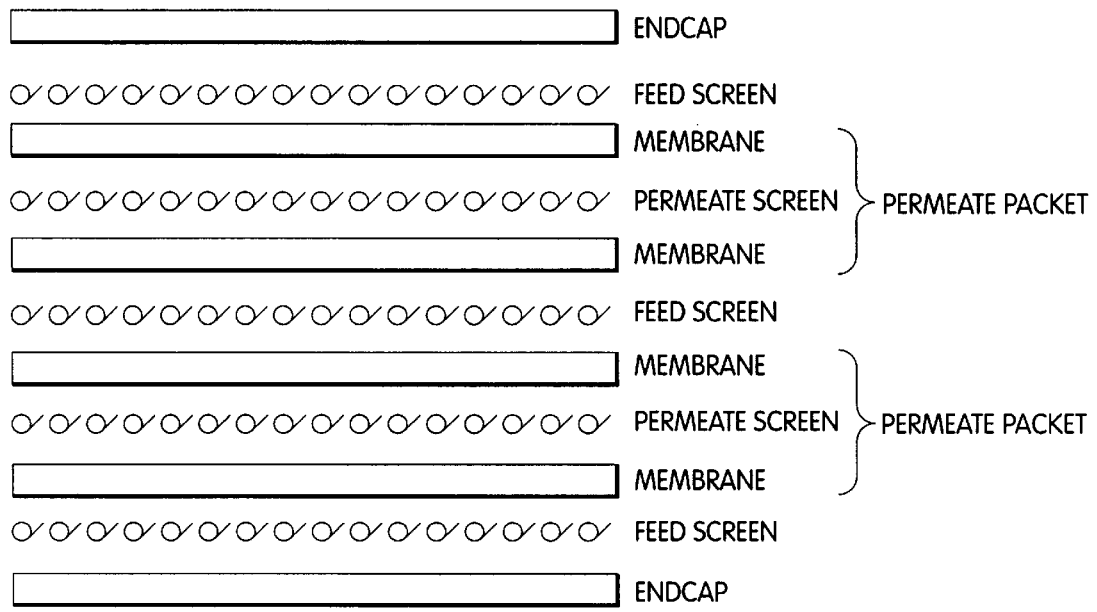

Referring to FIG. 16, an embodiment is shown having 2 end caps, n modules consisting of a permeate screen and two membranes and n plus 1 feed screens.

Figure 17:
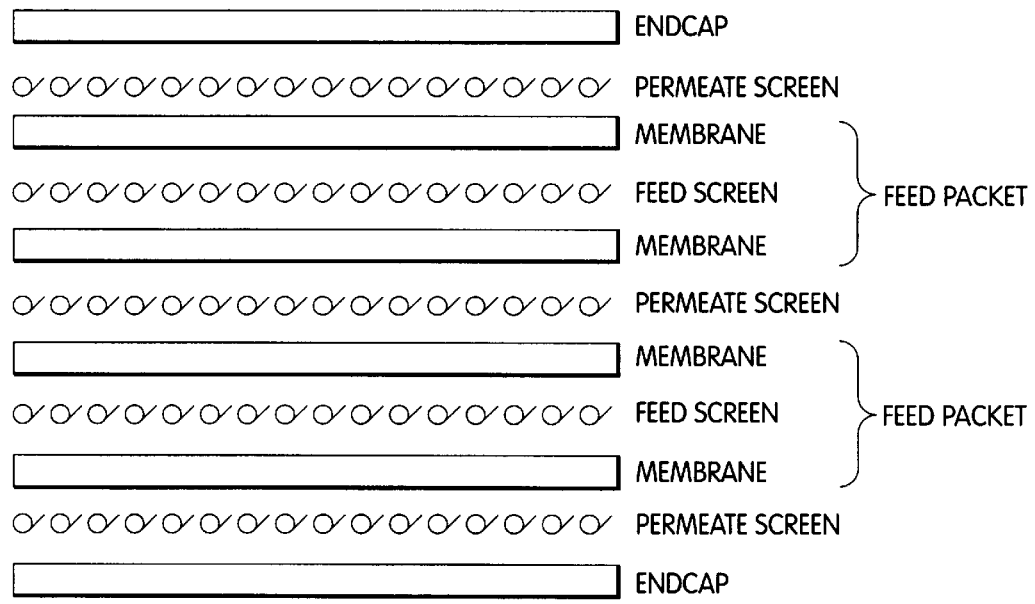

Referring to FIG. 17, an embodiment is shown having n modules consisting of a permeate screen and two membranes, n plus 1 feed screens and 2 end caps.

Figure 18:
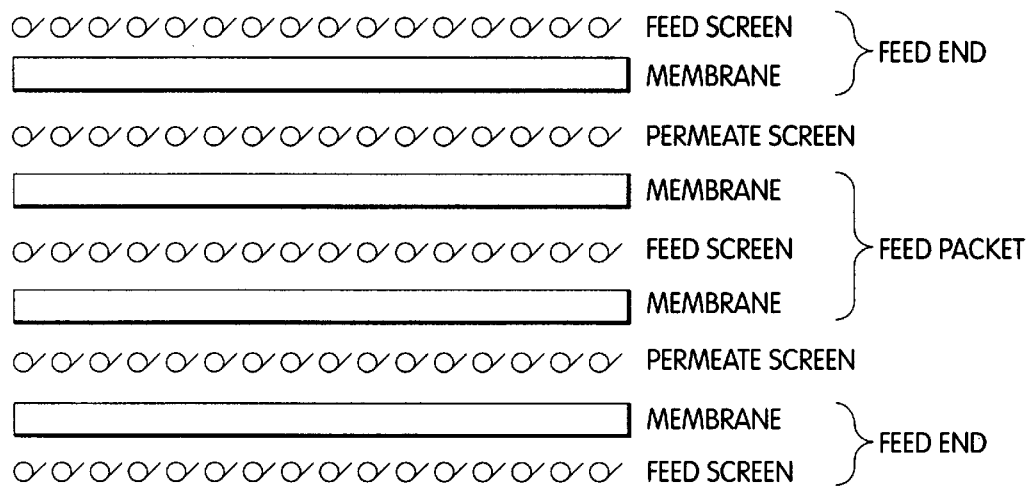

Referring to FIG. 18, an embodiment is shown having n permeate screens and n minus 1 modules consisting of a feed screen, two membranes and two modules consisting of a feed screen and a membrane.

Figure 19:
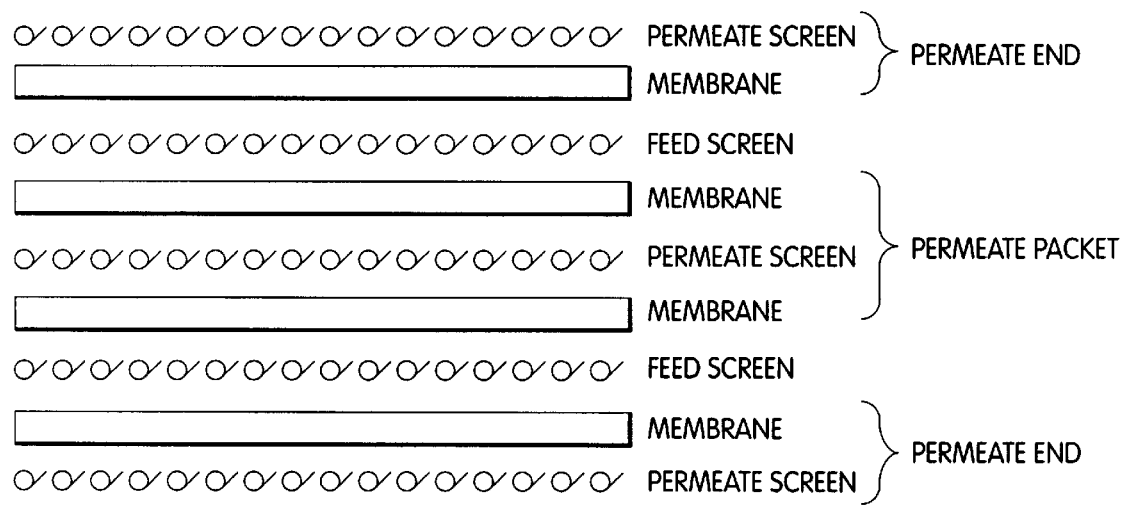

Referring to FIG. 19, an embodiment is shown having n feed screens, n minus 1 modules consisting of a permeate screen and two membranes and two end modules consisting of a permeate screen and a membrane.

Figure 20:
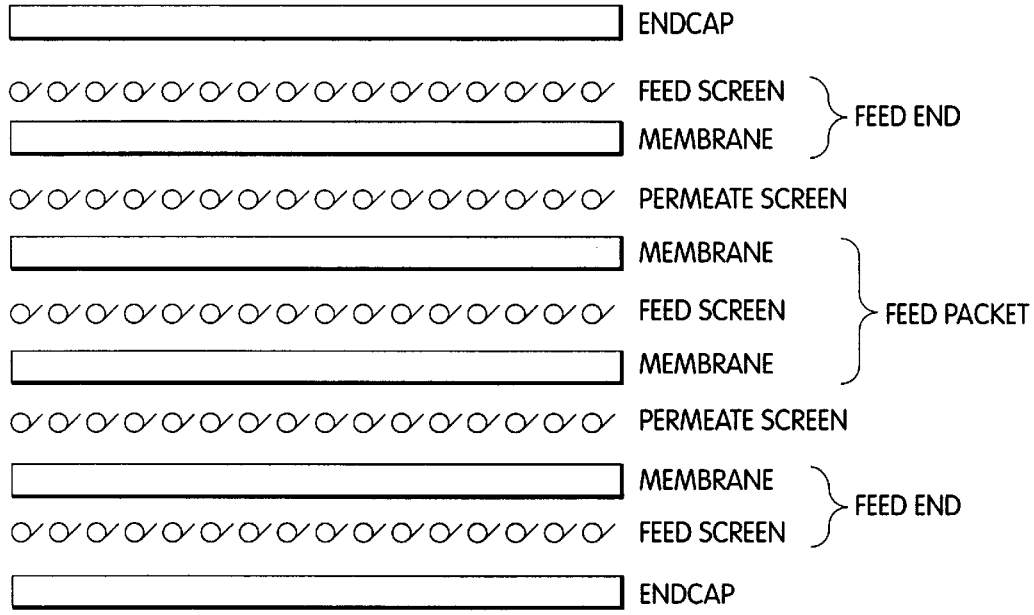

Referring to FIG. 20, an embodiment is shown having 2 end caps, n permeate screens and n minus 1 modules consisting of a feed screen and two membranes and two end modules consisting of a feed screen and a membrane.

Figure 21:
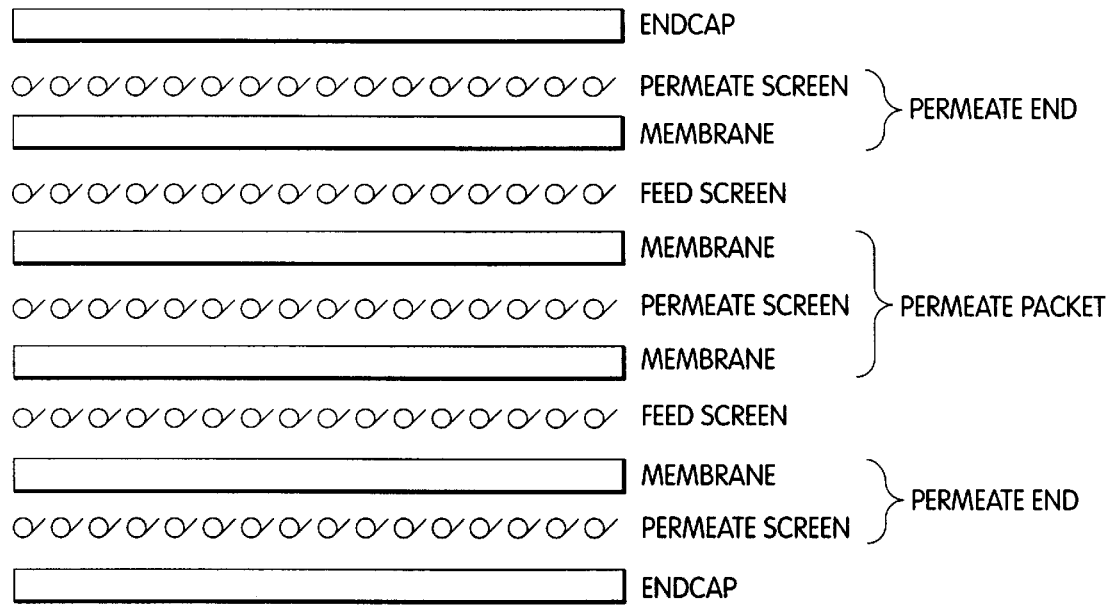

Referring to FIG. 21, an embodiment is shown having 2 end caps, n feed screens, n minus 1 modules consisting of a permeate screen and two membranes and two end modules consisting of a permeate screen and a membrane.

Figure 22:
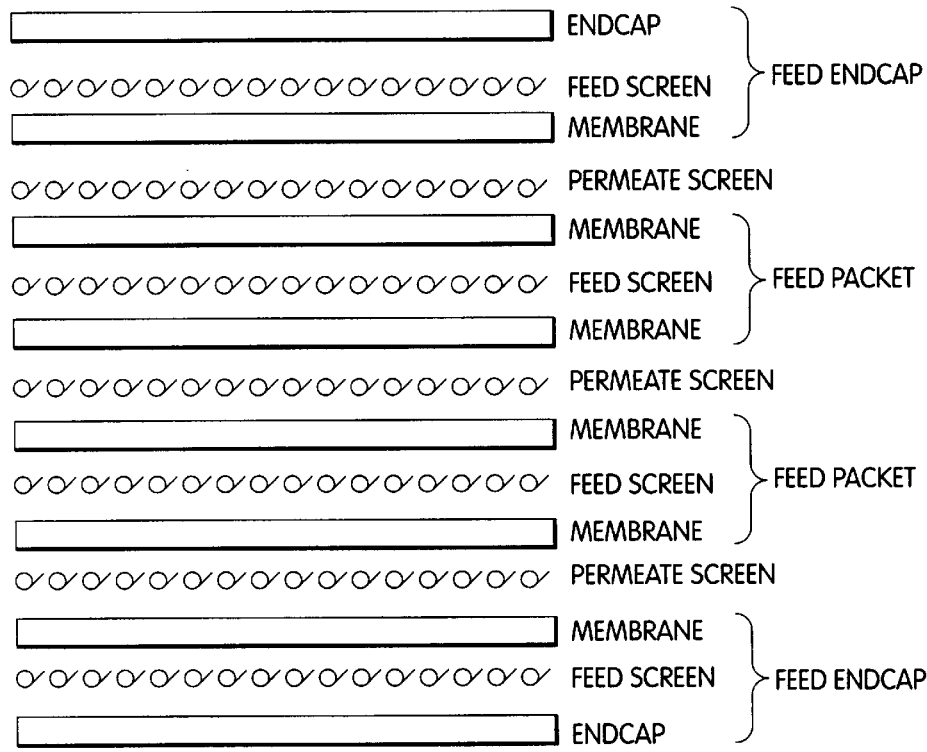

Referring to FIG. 22, an embodiment is shown having 2 end modules consisting of an end cap, a feed screen and a membrane, n permeate screens and n minus 1 modules consisting of a feed screen and two membranes.

Figure 23:
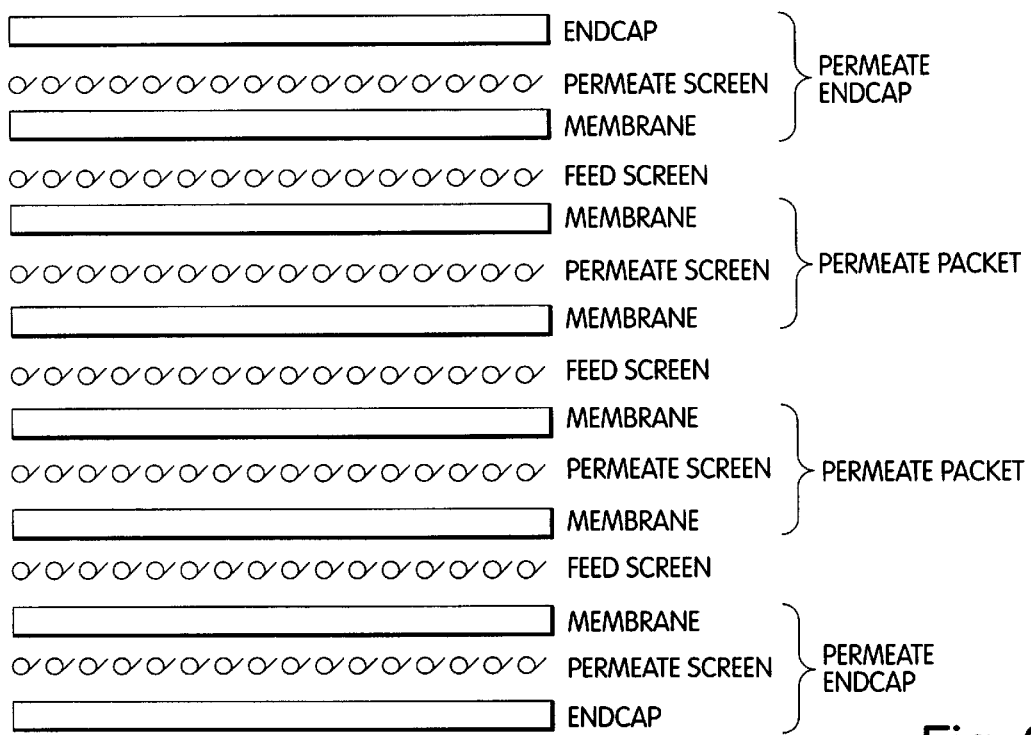

Referring to FIG. 23, an embodiment is shown having 2 end modules consisting of an end cap, a permeate screen and a membrane, n feed screens and n minus 1 modules consisting of a permeate screen and two membranes.

The following examples illustrate the present invention and are not intended to limit the same.

EXAMPLE I

This example illustrates a method for preparing a tangential flow filtration apparatus of this invention utilizing insert molding to effect final sealing within a stack of filtration modules provided with end caps and monolayer spacer layers.

End Cap

The end caps are molded from polypropylene homopolymer. They are molded in an aluminum mold using a injection molding machine. The mold is preheated to 130° F. and clamped at 10,000 pounds of force. The polypropylene homopolymer, at 500° F., is injected with a pressure of 3000 psi. The resultant end cap has two female Luer port connections.

First Overmold

In preparation for the next molding step a piece of polypropylene permeate screen and a piece of Millipore Biomax® 10 (polyethersulfone on nonwoven polypropylene), available from Millipore Corporation, Bedford, Mass. are die cut using a steel rule die. The permeate screen, a twill weave, has a thickness of 0.012 inch and has a strand count of 71×71 strands/inch.

The end cap, permeate screen and piece of Biomax® 10 membrane are placed together in an aluminum mold to create the first subassembly referred to as the First Overmold. The mold is aluminum and incorporates a sliding insert which exerts a clamping force on the assembly while molding. The mold is preheated to 130° F. and clamped at 10,000 pound of force. The insert is clamped at 1500 pounds of force. The polypropylene homopolymer, at 500° F., is injected with a pressure of 3000 psi. The resultant structure is the First Overmold subassembly.

Second Overmold

In this step the First Overmold subassembly is modified by the addition of feed and retentate Luer ports and by adding a bonding surface around the perimeter of the membrane. This is done by placing the first overmold subassembly in an aluminum mold with a sliding insert. The mold is preheated to 130° F. and clamped at 10,000 pounds of force. The insert is clamped at 1500 pounds of force. The polypropylene homopolymer at 500° F., is injected with a pressure of 3000 psi.

The resultant structure is the Second Overmold subassembly. This second overmold process is then repeated for another subassembly.

Feed Spacer

The feed spacer is woven polypropylene screen to which a solid polypropylene perimeter is added. The twill woven screen has a thickness of 0.016 inch and features a strand count of 51×51 threads/inch.

A steel rule die is used to cut the perimeter of the screen and two 0.156 inch diameter alignment holes in either end of the screen. The spacer is created using an aluminum mold with a sliding insert. The mold is preheated to 130° F. and clamped at 10,000 pounds of force. The insert is clamped at 1500 pounds of force. The polypropylene homopolymer polymer, at 500° F., is injected with a pressure of 3000 psi to form the Feed Spacer.

Deflection Cap

The polymer used for the deflection caps is a 30% glass filled polypropylene. The caps are molded in an aluminum mold and preheated to 130° F. and clamped at 10,000 pounds of force and injected with pressure of 4,500 psi.

Final Overmold

A feed spacer is sandwiched between two of the second overmold assemblies together with two deflection caps. The final unit is created by overmolding this assembly using molten polypropylene homopolymer to encapsulate/bond the perimeter. This is accomplished in an aluminum mold with a sliding insert. The mold is preheated to 130° F. and clamped at 10,000 pounds of force. The insert clamps the assembly at 1500 pounds of force. The polypropylene homopolymer, at 500° F., is injected with a pressure of 3000 psi.

Finished Unit

The finished unit has 19 $cm^2$ of Biomax® 10 membrane area. Hydraulic testing of this module gave the following results:

| | |
|---|---|
| Wetted Air Integrity | 0 SCCM @ 30 psi |
| Feed Channel Pressure Drop | 10 psi @ 50 ml/min $Q_f$ |
| Water Permeability | 19 LMH/psi |
| 6% BSA, 8 C flux | 127 LMH @ Q feed, 38cc/min. + TMP, 45 psi |

What is claimed is:

1. A membrane filter apparatus of unitary sealed construction for carrying out dead end filtration comprising:
   at least one module layer including at least two membrane filters and at least one spacer layer,
   said apparatus having at least two ports,
   at least one of said ports being a feed port and at least one of said ports being a filtrate port, each said filtrate port being sealed from fluid communication with said at least one feed port,
   said at least one module layer being sealed to form a perimeter about said at least one first spacer layer and said at least two membrane filters to form a first port seal, at said at least one part, which isolates said at least one filtrate port from said at least one feed port,
   at least one second spacer layer positioned adjacent each said at least one module layer and being insert molded to form a perimeter seal about the periphery of said at least one second spacer layer and said at least one module layer which seals said at least one filter port and which permits fluid flow within said apparatus to introduce a feed into said apparatus and to remove filtrate from said apparatus.

2. The apparatus of claim 1 wherein said at least one module layer comprises one feed screen as the at least one first spacer layer and one membrane filter.

3. The apparatus of claim 2 having an end cap at each end of said membrane filter apparatus.

4. The apparatus of claim 1 wherein said at least one module layer comprises one filtrate screen as the at least one first spacer layer and one membrane filter.

5. The apparatus of claim 4 having an end cap at each end of said membrane filter apparatus.

6. The apparatus of claim 1 including a second spacer layer at each end of said membrane filter apparatus and said at least one module layer comprising two membrane filters separated by a filtrate screen as an at least one first spacer layer.

7. The apparatus of claim 6 including an end cap positioned on each second spacer layer at each end of said membrane filter apparatus.

8. The apparatus of claim 1 including a second spacer layer at each end of said membrane filter apparatus and said at least one module layer comprising two membrane filters separated by a feed screen as an at least one first spacer layer.

9. The apparatus of claim 8 including an end cap positioned on each second spacer layer at each end of said membrane filter apparatus.

10. The apparatus of claim 1 wherein one of said module layers comprising a feed screen as a first spacer layer and a membrane filter is positioned at each end of said membrane filter apparatus and at least one of said module layers comprises a filtrate screen positioned between two membrane filters.

11. The apparatus of claim 10 including as end cap at each end of said membrane filter apparatus.

12. The apparatus of claim 1 wherein one of said module layers comprising a filtrate screen as a first spacer layer and a membrane filter is positioned at each end of said membrane filter apparatus and at least one of said module layers comprises a filtrate screen positioned between two membrane filters.

13. The apparatus of claim 12 including as end cap at each end of said membrane filter apparatus.

14. The apparatus of claim 1 which includes a plurality of filter ports, each of said module layers having two sets of filtrate tab sections for a filtrate port, said sets of tab sections being positioned on opposing surfaces of each of said module layers so that said filtrate tab sections on a first module layer are spaced apart from filtrate tab sections on each module layer adjacent said first module layer.

15. The apparatus of claim 14 wherein said membrane filters are microporous membranes.

16. The apparatus of claim 1 which includes a plurality of filter ports,
   each of said module layers having two sets of feed tab sections for a feed port,
   said sets of tab sections being positioned on opposing surfaces of each of said module layers so that said feed tab sections on a first module layer are spaced apart from feed tab sections on each module layer adjacent said first module layer.

17. The apparatus of claim 16 wherein said membrane filters are ultrafiltration membranes.

18. The apparatus of claim 1 wherein said at least one module layer comprises an end cap, one feed screen as the at least one first spacer layer and one membrane.

19. The apparatus of claim 1 wherein said at least one module layer comprises an end cap, one filtrate screen as the at least one first spacer layer and one membrane.

20. The apparatus of claim 1 wherein one of said module layers comprising a feed screen as a first spacer layer, an end cap and a membrane filter is positioned at each end of said membrane filter apparatus and at least one of said module layers comprises a feed screen positioned between two membrane filters.

21. The apparatus of claim 1 wherein one of said module layers comprising a filtrate screen as a first spacer layer, an end cap and a membrane filter is positioned at each end of said membrane filter apparatus and at least one of said module layers comprises a feed screen positioned between two membrane filters.

22. The apparatus of claim 1 wherein said membrane filters are microporous membranes.

23. The apparatus of claim 1 wherein said membrane filters are ultrafiltration membranes.

24. The apparatus of claim 1 which includes a plurality of filter ports.

* * * * *